US012346885B2

(12) United States Patent
Arora et al.

(10) Patent No.: US 12,346,885 B2
(45) Date of Patent: Jul. 1, 2025

(54) METHOD AND SYSTEM FOR CONTROL OF PII THROUGH LIMITING TRANSFERS ON BLOCKCHAIN

(71) Applicant: MASTERCARD INTERNATIONAL INCORPORATED, Purchase, NY (US)

(72) Inventors: Ankur Arora, New Delhi (IN); Jaipal Singh Kumawat, Rajasthan (IN); Chandan Garg, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 707 days.

(21) Appl. No.: 16/658,275

(22) Filed: Oct. 21, 2019

(65) Prior Publication Data

US 2021/0117938 A1    Apr. 22, 2021

(51) Int. Cl.
*G06F 21/62*    (2013.01)
*G06F 16/182*    (2019.01)
(Continued)

(52) U.S. Cl.
CPC ..... *G06Q 20/0658* (2013.01); *G06F 16/1834* (2019.01); *G06F 21/6263* (2013.01);
(Continued)

(58) Field of Classification Search
CPC ........... G06Q 20/0658; G06Q 20/3678; G06Q 20/02; G06Q 20/065; G06Q 20/223;
(Continued)

(56) References Cited

U.S. PATENT DOCUMENTS 11,038,857 B1 *  6/2021  Paczkowski ........ H04L 63/0485
2005/0234943 A1 * 10/2005  Clarke ................... H04L 67/38
(Continued)

FOREIGN PATENT DOCUMENTS

CN       109886040 A   *  6/2019  ............. G06F 21/60
WO    WO-2015189565 A1 * 12/2015  ........... H04L 63/083

OTHER PUBLICATIONS

Andreas M. Antonopoulos, Mastering Bitcoin, Dec. 2014, O'Reilly (Year: 2014).*

*Primary Examiner* — Neha Patel
*Assistant Examiner* — Chunling Ding
(74) *Attorney, Agent, or Firm* — Panitch Schwarze Belisario & Nadel LLP

(57) ABSTRACT

A method for delivering encrypted data through a blockchain with limited transferability includes: receiving, by a receiver of a blockchain node, a transfer submission including at least a transfer token, a recipient address, and an encrypted data message; determining, by a processor of the blockchain node, a number of past transfers for the transfer token in a blockchain associated with a blockchain network that includes the blockchain node; validating, by the processor of the blockchain node, that the transfer token is eligible for an additional transfer based on at least the number of past transfers; generating, by the processor of the blockchain node, a blockchain data value including at least the encrypted data message, the transfer token, and the recipient address; and transmitting, by a transmitter of the blockchain node, the generated blockchain data value to one or more additional nodes included in the blockchain network.

12 Claims, 5 Drawing Sheets

(51) Int. Cl.
*G06Q 20/06* (2012.01)
*G06Q 20/36* (2012.01)
*H04L 9/06* (2006.01)
*H04L 9/32* (2006.01)

(52) U.S. Cl.
CPC ....... *G06Q 20/3678* (2013.01); *H04L 9/0637* (2013.01); *H04L 9/3247* (2013.01)

(58) Field of Classification Search
CPC ........... G06Q 20/3827; G06Q 20/3829; G06Q 20/389; G06Q 20/401; G06Q 20/4016; G06Q 20/3674; G06Q 2220/00; H04L 9/0637; H04L 9/3247; H04L 63/0442; H04L 2209/56; H04L 9/3239; H04L 9/0825; H04L 9/088; H04L 2209/38; H04L 9/3213; H04L 9/3236; H04L 9/50; H04L 2209/60; G06F 21/6263; G06F 16/1834; G06F 16/27; G06F 21/64
See application file for complete search history.

(56) References Cited

U.S. PATENT DOCUMENTS

| | | | |
|---|---|---|---|
| 2017/0132625 A1* | 5/2017 | Kennedy | G06F 16/2379 |
| 2018/0144153 A1* | 5/2018 | Pead | G06F 21/6245 |
| 2019/0019135 A1* | 1/2019 | Vij | G06Q 10/083 |
| 2019/0347433 A1* | 11/2019 | Chakravorty | G06F 21/6209 |
| 2020/0211002 A1* | 7/2020 | Steinberg | H04L 9/3213 |
| 2020/0278982 A1* | 9/2020 | Bowman | G06F 16/23 |
| 2021/0160082 A1* | 5/2021 | Wang | G06Q 20/3823 |

* cited by examiner

METHOD AND SYSTEM FOR CONTROL OF PII THROUGH LIMITING TRANSFERS ON BLOCKCHAIN

FIELD

The present disclosure relates to delivering encrypted data through a blockchain with limited transferability, specifically the use of a blockchain and transfer-limited tokens to enable the delivery of encrypted data, which can include sensitive, personally identifiable information, without risk of unauthorized access and sharing of such information.

BACKGROUND

Individuals have any number of reasons for wanting and needing to share their personal information. For example, customers may need to provide residence and contact information prior to purchasing products. In another example, a customer may want to provide their name and phone number to a service provider to be contacted regarding service and for future reference. In another example, an individual may submit their e-mail address with an entity to receive a newsletter. However, in many cases, the individual that shares their data may be unwilling to have their data continue to be shared and may be displeased if such sharing occurs. In most instances, data that is shared without the user's authorization cannot be taken back.

As a result, individuals are often interested in methods and systems that can provide them with greater control over the use and sharing of their personal information. Most solutions rely on a third party repository that stores the user's personal information, which will distribute it to authorized entities at the instruction of the user. However, a central repository is prone to being compromised, and the user can often lose track of how often their information is being shared and with how many entities, effectively surrendering their control on their own information. Thus, there is a need for a system that can retain user control with the entities themselves and provide for controls and limitation on the sharing of personally identifiable information.

SUMMARY

The present disclosure provides a description of systems and methods for delivering encrypted data through a blockchain with limited transferability. A blockchain is used to store encrypted data packages, such as can be used for transferring personally identifiable information. Each encrypted data package must be accompanied by a token, where the tokens are limited in the number of times they may be used to post data on the blockchain. This effectively limits the spread of the information at the behest of the user, with use of a blockchain, which is a decentralized, and automated system, ensuring that the user retains complete control over how and when their information is spread. Because of this limitation on sharing and the use of encryption, an entity that receives PII cannot continue to share the information without revealing their sharing of the information to the user or potentially sharing their own private key. As such, not only do users have more control, there is also more incentive for recipients to honor their commitment to keeping the personal information secure.

A method for delivering encrypted data through a blockchain with limited transferability includes: receiving, by a receiver of a blockchain node, a transfer submission including at least a transfer token, a recipient address, and an encrypted data message; determining, by a processor of the blockchain node, a number of past transfers for the transfer token in a blockchain associated with a blockchain network that includes the blockchain node; validating, by the processor of the blockchain node, that the transfer token is eligible for an additional transfer based on at least the number of past transfers; generating, by the processor of the blockchain node, a blockchain data value including at least the encrypted data message, the transfer token, and the recipient address; and transmitting, by a transmitter of the blockchain node, the generated blockchain data value to one or more additional nodes included in the blockchain network.

A system for delivering encrypted data through a blockchain with limited transferability includes: a blockchain network; a blockchain node included in the blockchain network; and a plurality of additional nodes in the blockchain network, wherein the blockchain node includes a receiver receiving a transfer submission including at least a transfer token, a recipient address, and an encrypted data message, a processor determining a number of past transfers for the transfer token in a blockchain associated with a blockchain network that includes the blockchain node, validating that the transfer token is eligible for an additional transfer based on at least the number of past transfers, and generating a blockchain data value including at least the encrypted data message, the transfer token, and the recipient address; and a transmitter transmitting the generated blockchain data value to one or more additional nodes included in the blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Delivery of Encrypted Data with Limited Transfer Via Blockchain

Figure 1:
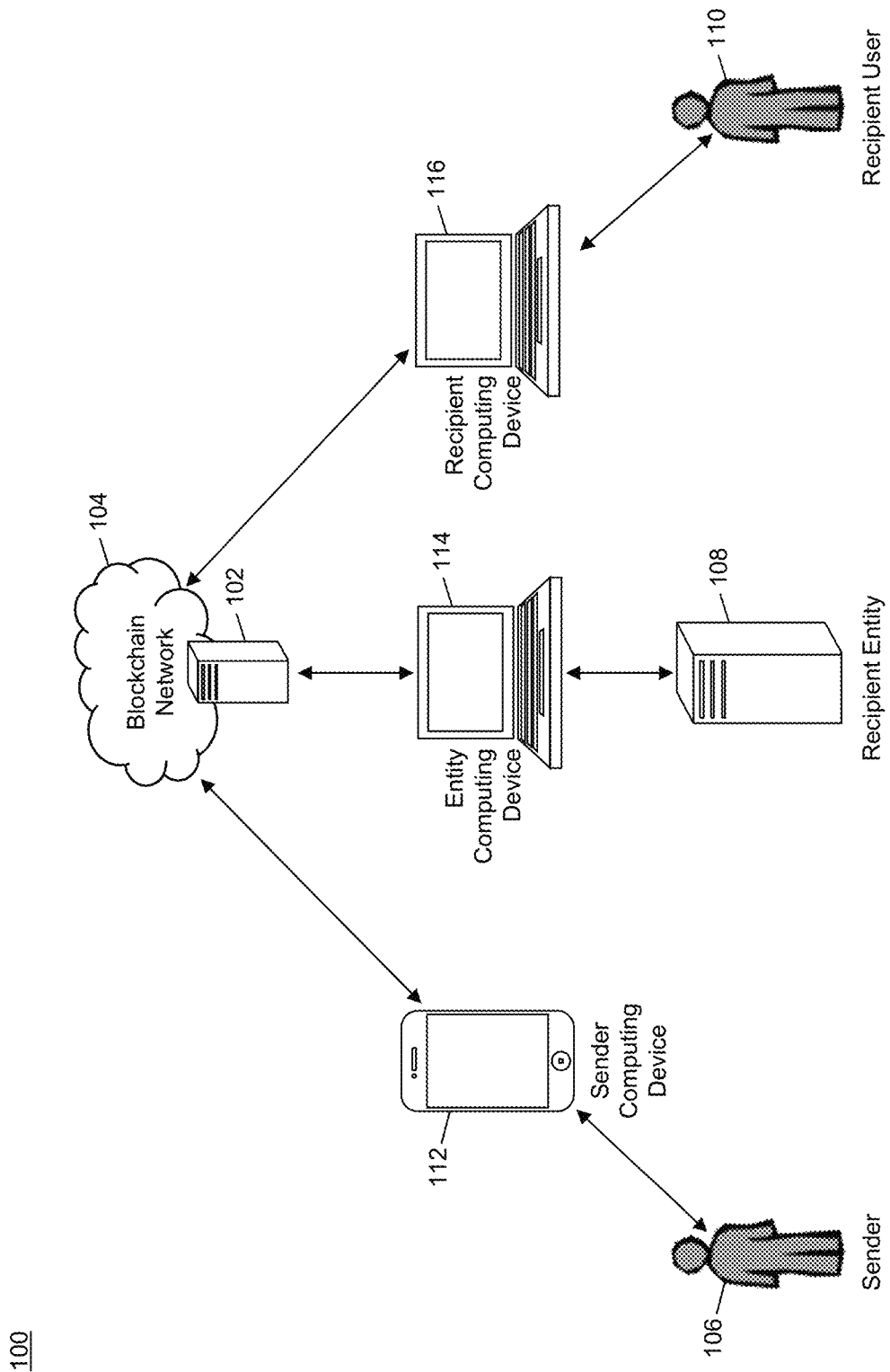
FIG. 1 is a block diagram illustrating a high level system architecture for delivering encrypted data through a blockchain with limited transferability in accordance with exemplary embodiments.

FIG. 1 illustrates a system 100 for the delivery of encrypted data, such as may include personally identifiable information, through a blockchain where there is limited transferability on the data.

Figure 2:
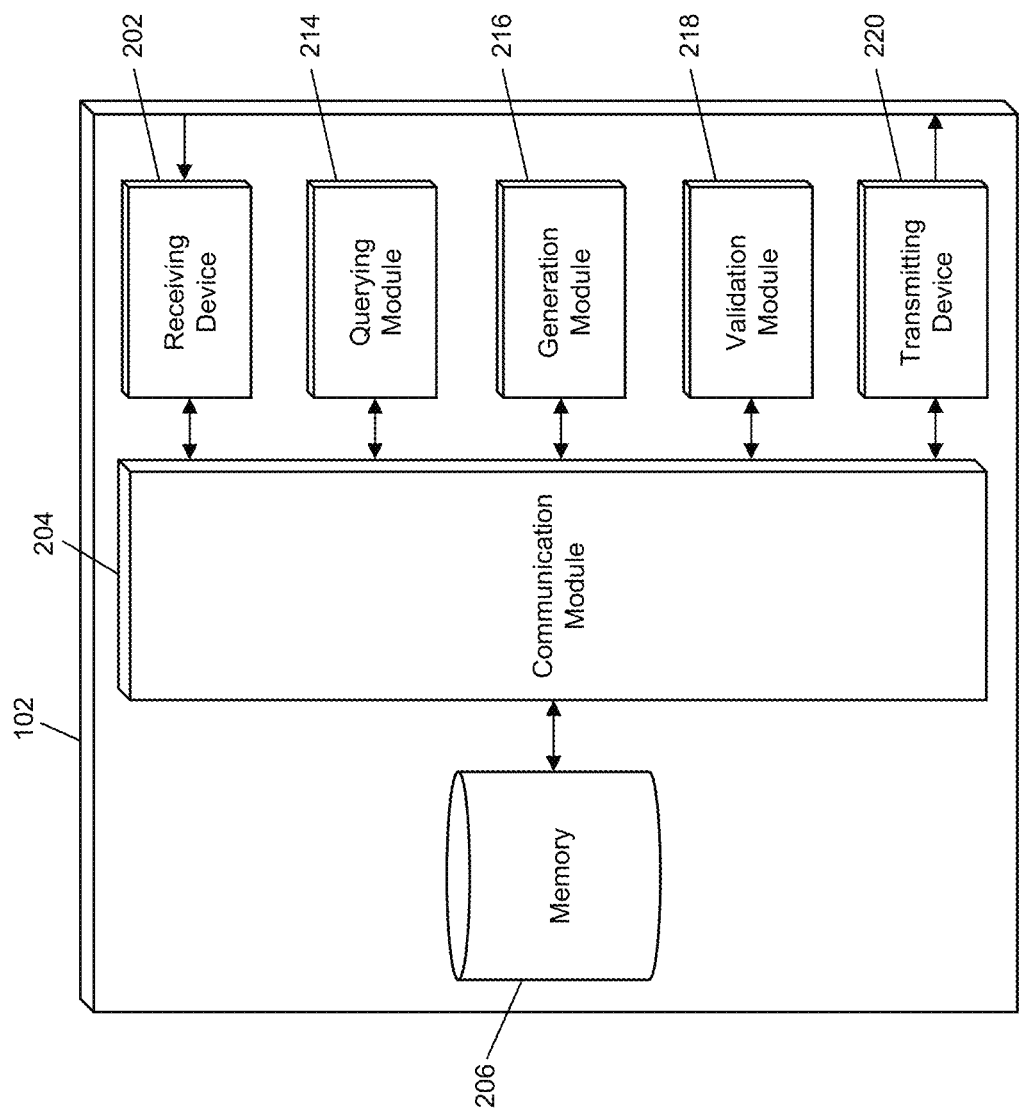
FIG. 2 is a block diagram illustrating the blockchain node of the system of FIG. 1 for delivering encrypted data with limited transferability in accordance with exemplary embodiments.
Figure 5:
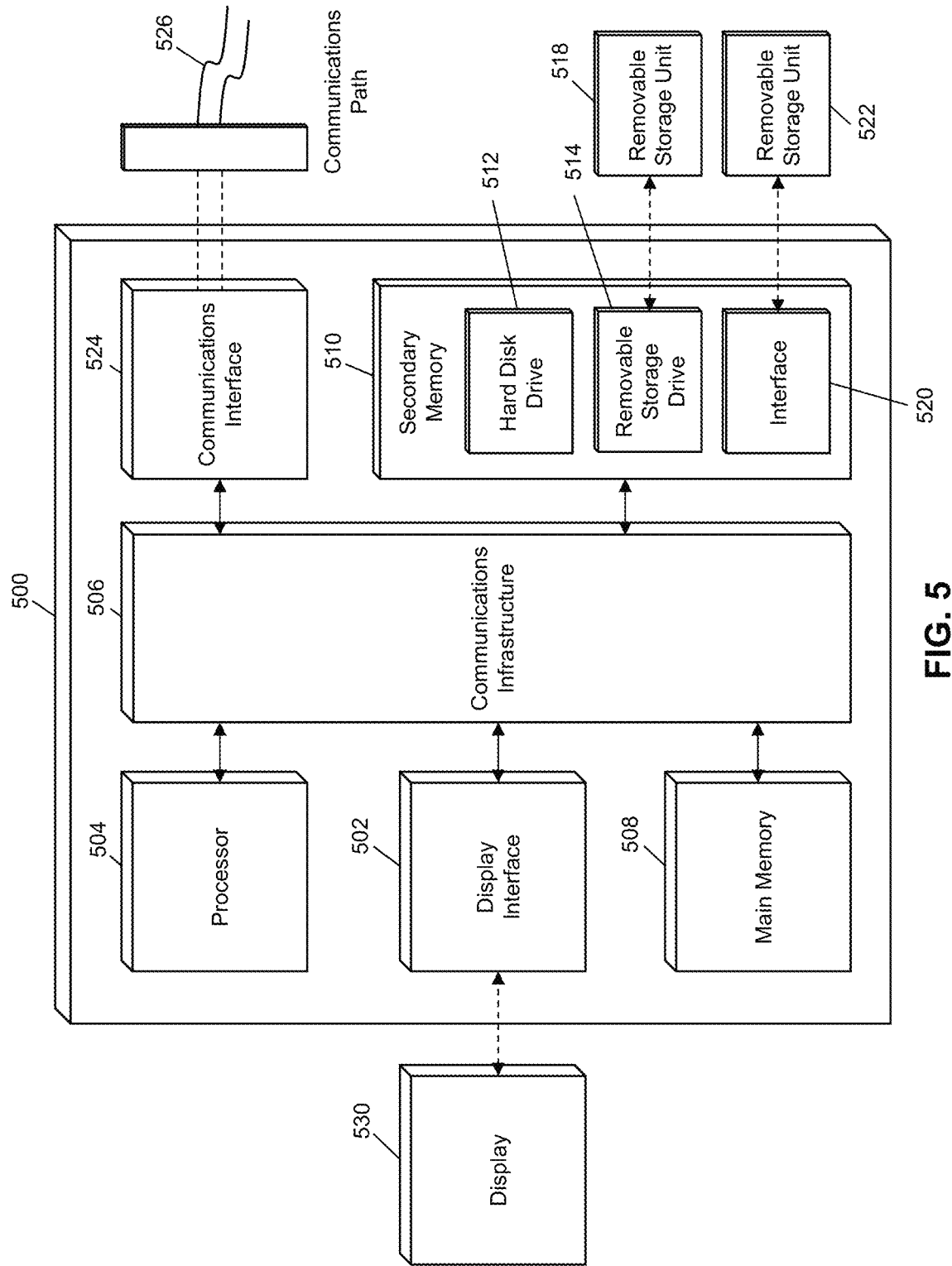
FIG. 5 is a block diagram illustrating a computer system architecture in accordance with exemplary embodiments.

The system 100 may include a plurality of blockchain nodes 102, discussed in more detail below, that comprise a blockchain network 104. Each blockchain node 102 may be a computing system, such as illustrated in FIG. 2 and FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device that stores the private key for use thereof in blockchain transactions. For instance, each computing device may each have their own private key for respective cryptographic key pairs, and may each be a blockchain wallet for use in transactions with the blockchain associated with the blockchain network.

In other embodiments, the blockchain may be used to store any other type of data in an immutable format. For instance, a blockchain may be used to track ownership of land deeds, where changes in ownership may be recorded as direct transfers (e.g., similar to transfers of currency) or where changes may be stored as data. In another example, a blockchain may be used for voting, where votes may be attributed to blockchain wallets and counted accordingly. Other uses for a blockchain for data storage will be apparent to persons having skill in the relevant art. As discussed herein, the storage of any data in a blockchain may be referred to as a "transaction." For instance, in the above example, a change in ownership in land deed or a casted vote in an election may be a "transaction" stored in the blockchain.

In the system 100, blockchain data values may include encrypted data for use in transfer of data from a sender 106 to a recipient, such as a recipient entity 108 or recipient user 110. The encrypted data may include any data that the sender 106 may wish to transfer, which may include sensitive personal or financial data. The data may be encrypted using a public key of a cryptographic key pair associated with the recipient. For instance, a recipient entity 108 or recipient user 110 may have a computing device, illustrated in FIG. 1 as entity computing device 114 and recipient computing device 116, respectively. Each computing device discussed herein may be any type of computing device that is specially configured to perform the functions discussed herein, such as a specially configured desktop computer, laptop computer, notebook computer, tablet computer, cellular phone, smart phone, smart watch, wearable computing device, implantable computing device, etc. The recipient entity 108 may, for example, have a cryptographic key pair, referred to herein as a recipient key pair, on their entity computing device 114, which may include a recipient private key and a recipient public key. The entity computing device 114 may provide its recipient public key to a computing device of the sender 106, referred to herein as the sender computing device 112. The sender 106 may encrypt the data they wish to transfer on the sender computing device 112 using the recipient public key.

When the sender 106 wants to send the encrypted data to a recipient entity 108, the sender 106 may submit the encrypted data to a blockchain node 102 in the blockchain network 104 using any suitable communication network and method. The submission may include the encrypted data and a recipient address associated with the recipient. In an exemplary embodiment, the recipient address may be a blockchain address, such as may be generated using the recipient public key that was used in the encryption. In some cases, a separate public key, such as associated with a blockchain wallet of the entity computing device 114, may be used to generate the address, which may be generated by the entity computing device 114 or the sender computing device 112.

The sender 106 may also have to provide a transfer token with the encrypted data and recipient address. The transfer token may be a unique value used to indicate that a transfer of the associated encrypted data is intended. The transfer token may be generated by a blockchain node 102, or may be generated by the blockchain wallet used in the first time encrypted data is transferred. For instance, the sender 106 may generate a transfer token using the sender computing device 112 the first time the encrypted data is being submitted to the blockchain.

In the system 100, a transfer token may be limited in the number of times that it may be used for a transfer. In some cases, the blockchain network 104 may have a predetermined limit on the number of transfers established for all transfer tokens. In other cases, transfer tokens may have predetermined limits on transfers established on a token-by-token basis. In some such cases, the blockchain network 104 may store data regarding the number of transfers available or possible for a transfer token, such as may be stored in a specialized database for such data or stored in the blockchain itself. For example, the blockchain data value that includes encrypted data and a transfer token that is first used may include the predetermined number of transfers for which that transfer token may be used. In other cases, the predetermined number may be included in the transfer token itself. In some instances, the available number of transfers may be stored in the token, where each time the transfer token is used, the number may be decremented, such as by the blockchain wallet that submits the transfer token for use or the blockchain node during verification of the data. The number of transfers may be represented using any suitable method, such as via integer numbers that are decremented, a series of values that follow a predetermined order (e.g., colors going from green to yellow to red to indicate no more transfers).

In some cases, each transfer token may be tied to a specific blockchain wallet. For example, the sender computing device 112 may use a transfer token when submitting encrypted data with a specific recipient address. Use of the transfer token may then be limited to transfers related to the initial blockchain data value. For instance, only the blockchain wallet associated with the recipient address may be able to use the transfer token in subsequent transfers. Compliance with such a requirement may be checked by the blockchain nodes 102, which may view any earlier blockchain data values when a new transaction is received to determine if the transfer token was previously used, and checking to see if the recipient of the most recent transfer matches the submitting blockchain wallet.

When a new blockchain data value is submitted by the sender 106 using the sender computing device 112, the blockchain node 102 may validate the digital signature using the sender's public key, may validate the transfer token to ensure that the token is genuine, authorized for transfer by the sender's blockchain wallet, and may validate that there are still transfers available for that transfer token, such as by checking the number of past transfers in the blockchain against the predetermined number for all tokens or the specific token being used, or by checking a value of remaining transfers in the transfer token itself. In cases where the transfer token includes the value of remaining transfers, validation of the transfer token may include validating that the value of remaining transfers has been properly deducted with each use of the transfer token.

If the validations of the blockchain wallet and transfer token are successful, then the blockchain node 102 may include the blockchain data value in a new block that is generated. The new block may include a block header that includes a timestamp, data reference value that refers to each of the blockchain data values being included in the new block (e.g., a root of a Merkle tree generated using the blockchain data values), and a block reference value that refers to the most recent block added to the blockchain prior to the new block (e.g., a hash value generated from hashing the block header of the most recent block). The new block may be transmitted to a plurality of other blockchain nodes 102 in the blockchain network 104, which may confirm the block and provide a notification thereof to the blockchain node 102. Once a suitable number of confirmations has been received (e.g., above an established amount, a majority of blockchain nodes 102, etc.), then the new block may be distributed to all blockchain nodes 102 for addition to the blockchain.

In some cases, the blockchain node 102 may notify the recipient of encrypted data of the new blockchain data value. In such cases, the blockchain network 104 may have contact information for each blockchain wallet stored therein. In an example, the sender 106 may submit encrypted data with an address of the entity computing device's blockchain wallet as the recipient address. In such an example, the blockchain node 102 may identify the entity computing device 114 based on the recipient address, and transmit a notification message thereto, which may include an indication of the new blockchain data value or may include the encrypted data itself. The entity computing device 114 may then obtain the encrypted data, which may be decrypted using its recipient private key. The entity computing device 114 may then have the data from the sender 106, which may be securely received and obtained with a limited number of transfers.

In some cases, the recipient entity 108 may have a desire to share the encrypted data received from the sender 106, such as to the recipient user 110. In such cases, the recipient entity 108 may make its own submission for a new blockchain data value to a blockchain node 102, where the recipient address may be generated using the public key of the recipient computing device 116. The submission may be received and validated by the blockchain node 102 as discussed above. In such instances, the transfer token may be the same token used in the initial transfer to the entity computing device 114, where the blockchain node 102 may validate that the transfer token is being used by the recipient of the encrypted data initially, and may validate that the transfer token may still be used a second time, such as based on predetermined limits or information included in the transfer token itself. If the validation is successful, the submission may be included in a new blockchain data value that is added into a new block that is confirmed and added to the blockchain. In some cases, the recipient computing device 116 may be notified of the new submission and/or provided with the encrypted data thereof. The encrypted data in the new blockchain data value may be different than the encrypted data included in the initial submission by the sender 106. For instance, the entity computing device 114 may decrypt the initial encrypted data, which may be re-encrypted using the public key of the recipient computing device 116, such that the recipient computing device 116 may be able to decrypt the data using its own private key.

The methods and systems discussed herein enable the sender 106 to have greater control and security on the transfer of information, which may include any personal information or other sensitive data. The use of the blockchain and transfer tokens ensures that only transfers that are properly authorized may be honored, and provides the sender 106 with the ability to control where the data is being transferred and how many times new transfers can occur. As a result, there is greater control and convenience for senders without the need for improvements or modifications to sender computing devices 112 or recipient computing devices 116 beyond the use of cryptographic public keys and communications with blockchain nodes 102.

Blockchain Node

FIG. 2 illustrates an embodiment of a blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 500 illustrated in FIG. 5 and discussed in more detail below may be a suitable configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102, sender computing devices 112, entity computing devices 114, recipient computing devices 116, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other blockchain nodes 102 that may be superimposed or otherwise encoded with blockchain data values for confirmations or confirmations thereof, new blocks for confirmation or confirmations thereof, and confirmed blocks for addition to the blockchain. The receiving device 202 may also be configured to receive data signals electronically transmitted by sender computing devices 112, entity computing devices 114, and/or recipient computing devices 116, which may be superimposed or otherwise encoded with submission for new blockchain data values, which may include digital signatures, encrypted data, recipient addresses, and transfer tokens.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The blockchain node 102 may also include a memory 206. The memory 206 may be configured to store data for use by the blockchain node 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein. The memory 206 may be configured to store, for example, cryptographic keys, salts, nonces, communication information for blockchain nodes 102 and blockchain networks 104, address generation and validation algorithms, digital signature generation and validation algorithms, hashing algorithms for generating reference values, rules regarding generation of new blocks and block headers, transfer token rules and transfer limits, communication data for recipient computing devices 116, etc.

The blockchain node 102 may include a querying module 214. The querying module 214 may be configured to execute queries on databases to identify information. The querying module 214 may receive one or more data values or query strings, and may execute a query string based thereon on an indicated database, such as the memory 206 of the blockchain node 102 to identify information stored therein. The querying module 214 may then output the identified information to an appropriate engine or module of the blockchain node 102 as necessary. The querying module 214 may, for example, execute a query on the memory 206 to identify past blockchain data values in the blockchain that includes a transfer token for determining the number of past transfers for validating a future attempted transfer.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate blockchain reference values, data reference values, new block headers, new blocks, notification messages for recipient computing devices 116, etc.

The blockchain node 102 may also include a validation module 218. The validation module 218 may be configured to perform validations for the blockchain node 102 as part of the functions discussed herein. The validation module 218 may receive instructions as input, which may also include data to be used in performing a validation, may perform a validation as requested, and may output a result of the validation to another module or engine of the blockchain node 102. The validation module 218 may, for example, be configured to validate digital signatures, inputs for new blockchain transactions, transfer tokens, etc.

The blockchain node 102 may also include a transmitting device 220. The transmitting device 220 may be configured to transmit data over one or more networks via one or more network protocols. In some instances, the transmitting device 220 may be configured to transmit data to additional nodes 106, first computing devices 108, second computing devices 110, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to other blockchain nodes 102 that may be superimposed or otherwise encoded with blockchain data values for confirmation or confirmations thereof, new blocks for confirmation or confirmations thereof, new blocks for addition to the blockchain, etc. the transmitting device 220 may also be configured to electronically transmit data signals to sender computing devices 112, entity computing devices 114, and/or recipient computing devices 116, which may be superimposed or otherwise encoded with notification messages regarding submitted blockchain data values, regarding being recipient of a new submission or encrypted data therein, etc.

Process for Delivery of Encrypted Data via Blockchain

Figure 3:
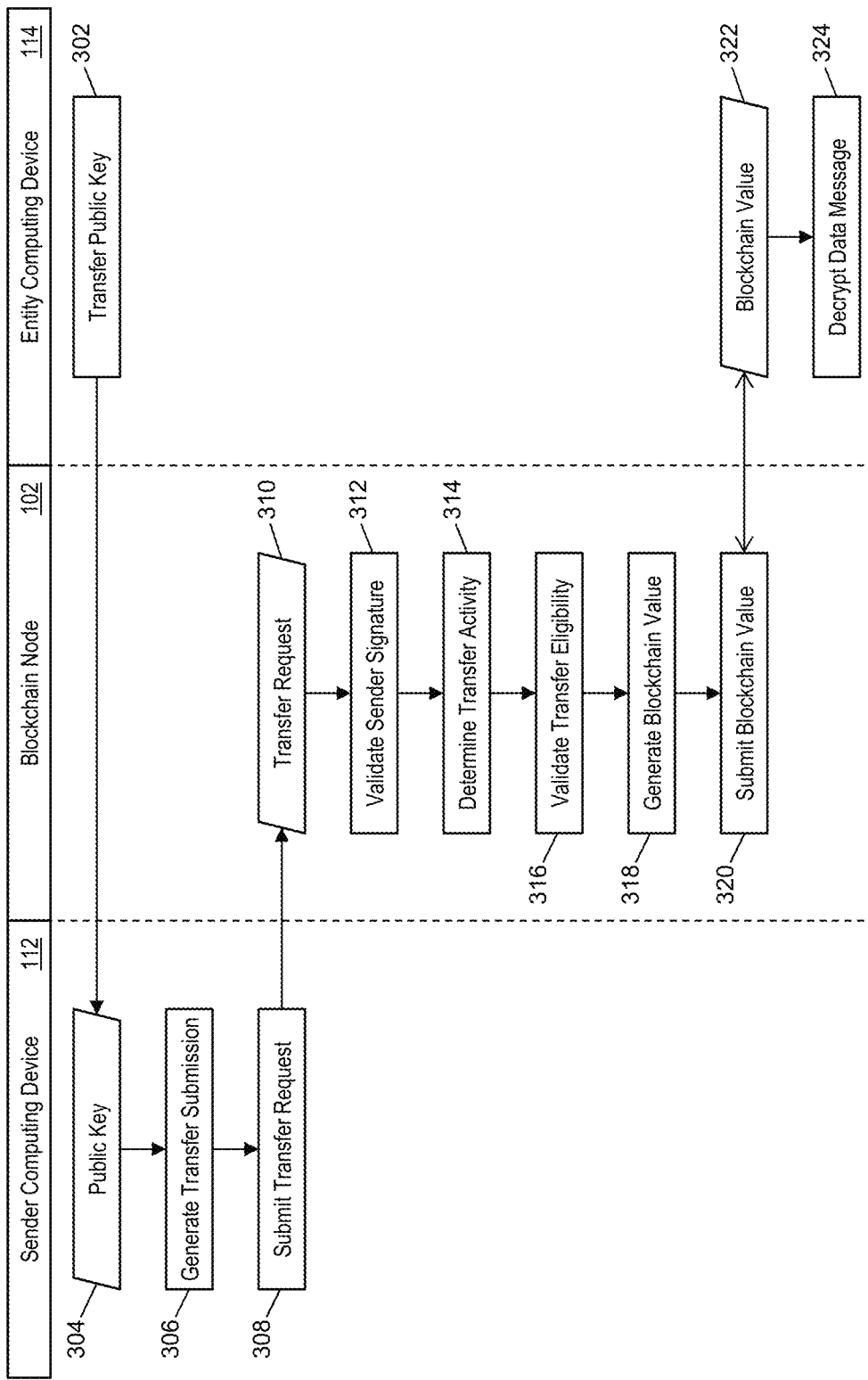
FIG. 3 is a flow diagram illustrating a process for delivering encrypted data through a blockchain in the system of FIG. 1 in accordance with exemplary embodiments.

FIG. 3 illustrates an example process executed in the system 100 of FIG. 1 for the delivery of encrypted data with limited transferability using the blockchain network 104 and transfer tokens.

In step 302, the entity computing device 114 may provide its recipient public key to the sender computing device 112 using a suitable communication network and method. In step 304, the sender computing device 112 may receive the recipient public key. In step 306, the sender computing device 112 may generate a blockchain data value submission for the transfer of encrypted data to the entity computing device 114. The encrypted data may be encrypted using the recipient public key received from the entity computing device 114. The submission may include at least the encrypted data to be transferred, a digital signature generated by the sender computing device 112 using its sender private key, a recipient address generated using the recipient public key, and a transfer token. In some cases, the transfer token may be previously provisioned to the sender computing device 112. In other cases, the transfer token may be generated by the sender computing device 112 using the sender public key.

In step 308, the sender computing device 112 may electronically transmit the generated submission to the blockchain node 102 using a suitable communication network and method. In step 310, the receiving device 202 of the blockchain node 102 may receive the submitted request for transfer of encrypted data. In step 312, the validation module 218 of the processing server 102 may validate the digital signature included in the received submission using the public key of the sender computing device's cryptographic key pair. In step 314, the querying module 214 of the blockchain node 102 may execute a query on the memory 206 of the blockchain node 102 to identify past activity of the transfer token included in the received transfer request. In step 316, the validation module 218 of the blockchain node 102 may validate the transfer token to indicate that the request is still eligible for another transfer. This validation may be based on the number of past transfers identified in step 314 and the predetermined number of transfers allowed for the transfer token, which may be included in the transfer token itself or otherwise set by the blockchain network 104 as indicated in a value stored in the memory 206 of the blockchain node 102.

If the digital signature and transfer token are both valid, then, in step 318, the generation module 216 of the blockchain node 102 may generate a new blockchain data value for the transfer. The blockchain data value may include the digital signature, encrypted data, recipient address, and transfer token. The blockchain data value may be included in a new block that is generated by the generation module 216. In step 320, the transmitting device 220 of the blockchain node 102 may electronically transmit the newly generated block that includes the new blockchain data value to a plurality of other blockchain nodes 102 in the blockchain network 104 for confirmation and addition to the blockchain. The block may be thereby included in the blockchain and available for reading by entities. In step 322, the entity computing device 114 may access the blockchain and identify its blockchain wallet as the recipient of the new blockchain data value, based on the recipient address included therein. In step 324, the entity computing device 114 may decrypt the encrypted data included in the new blockchain data value using its private key.

Exemplary Method for Delivering Encrypted Data

Figure 4:
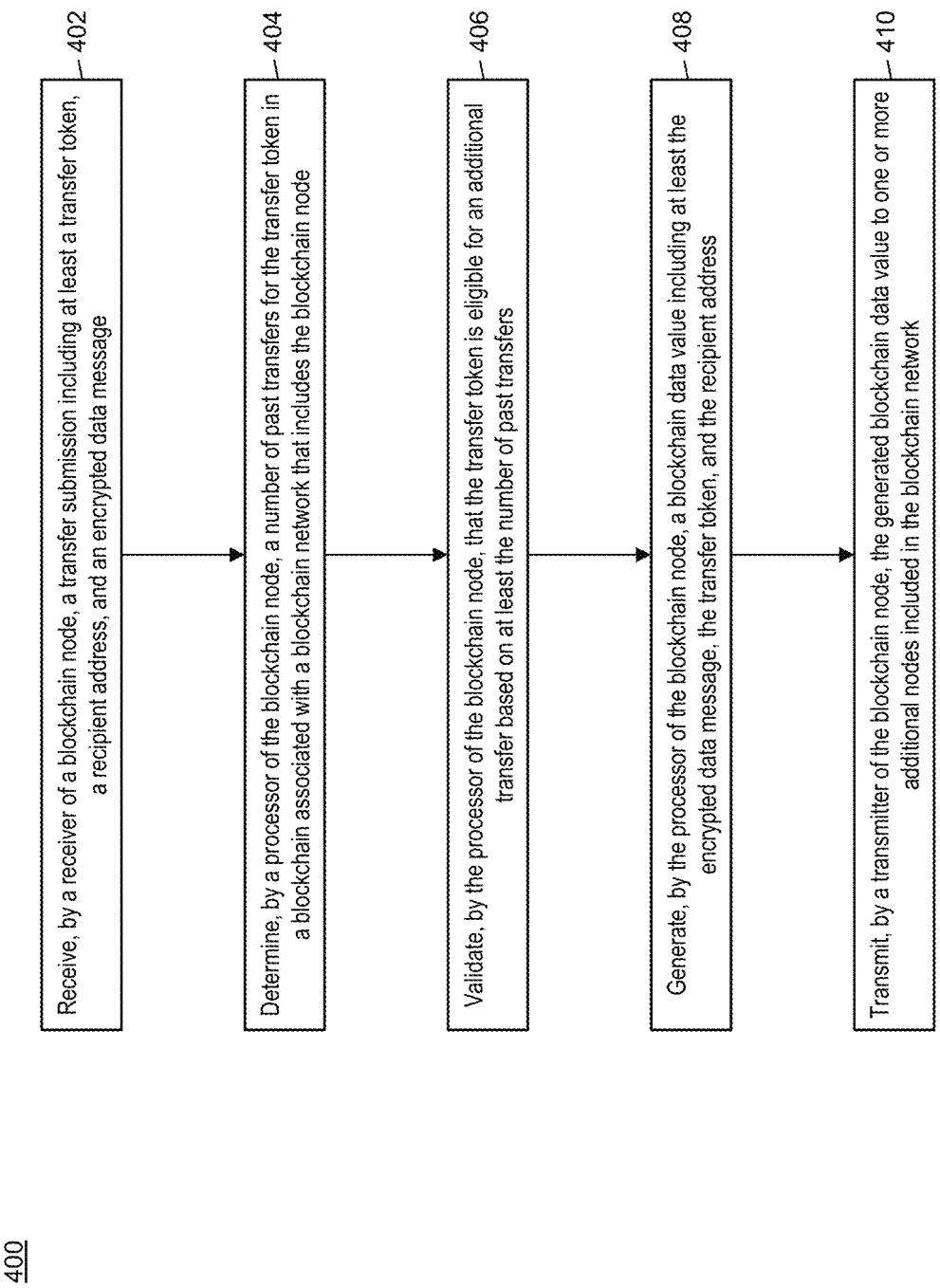
FIG. 4 is a flow chart illustrating an exemplary method for delivering encrypted data through a blockchain with limited transferability in accordance with exemplary embodiments.

FIG. 4 illustrates a method 400 for the delivery of encrypted data through a blockchain with limited transferability due to the use of transfer tokens for which the number of transfers is subject to a predetermined limit.

In step 402, a transfer submission may be received by a receiver (e.g., receiving device 202) of a blockchain node (e.g., blockchain node 102), where the transfer submission includes at least a transfer token, recipient address, and an encrypted data message. In step 404, a processor (e.g., querying module 214) of the blockchain node may determine a number of past transfers for the transfer token in a blockchain associated with a blockchain network (e.g., blockchain network 104) that includes the blockchain node.

In step 406, the processor (e.g., validation module 218) of the blockchain node may validate that the transfer token is eligible for an additional transfer based on at least the number of past transfers. In step 408, a blockchain data value including at least the encrypted data message, the transfer token, and the recipient address may be generated by the processor (e.g., generation module 216) of the blockchain node. In step 410, the generated blockchain data value may be transmitted by a transmitter (e.g., transmitting device 220) of the blockchain node to one or more additional nodes included in the blockchain network.

In one embodiment, the encrypted data message may be encrypted using a public key of a recipient cryptographic key pair, and the recipient address may be generated using the public key of the recipient cryptographic key pair. In some embodiments, the transfer submission may further include a digital signature generated using a private key of a sender cryptographic key pair, and the method further 400 may also include validating, by the processor of the blockchain node, the digital signature using a public key of the sender cryptographic key pair. In a further embodiment, the generated blockchain data value may further include the digital signature.

In one embodiment, the number of past transfers may be determined based on a data value included in the transfer token. In some embodiments, the number of past transfers may be determined by evaluating a plurality of blockchain data values included in a plurality of blocks comprising the blockchain, and the number of past transfers may be based on a number of blockchain data values that include the transfer token. In one embodiment, validating that the transfer token is eligible for an additional transfer may be further based on a predetermined number of allowed transfers. In some embodiments, validating that the transfer token is eligible for additional transfers may include: deducting, by the processor of the blockchain node, a transfer count value included in the transfer token; and determining, by the processor of the blockchain node, that the deducted transfer count value is greater than zero.

Computer System Architecture

FIG. 5 illustrates a computer system 500 in which embodiments of the present disclosure, or portions thereof, may be implemented as computer-readable code. For example, the blockchain node 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for delivering encrypted data through a blockchain with limited transferability. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for delivering encrypted data through a blockchain with limited transferability, comprising:

receiving, by a receiver of a blockchain node of a blockchain network, a transfer submission from an external sender computing device, said transfer submission including at least a transfer token, an encrypted data message, and a recipient address associated with a recipient to which the encrypted data message is intended, wherein said transfer token is limited to a predetermined number of allowed transfers that is initially established by the blockchain network for transfer tokens;

determining, by a processor of the blockchain node, past activity of the transfer token including a number of past transfers for the transfer token in a blockchain associated with the blockchain network that includes the blockchain node;

validating, by the processor of the blockchain node, that the transfer token is eligible for an additional transfer based on at least the number of past transfers and the predetermined number of allowed transfers;

in response to validating the eligibility of the transfer token, generating, by the processor of the blockchain node, a blockchain data value including at least the encrypted data message, the transfer token, and the recipient address, each received by the blockchain node, from the external sending computing device, in the transfer submission;

transmitting, by a transmitter of the blockchain node, the generated blockchain data value to one or more additional nodes included in the blockchain network; and using the recipient address, notifying, by the blockchain node, the recipient, via a recipient computing device, of the received encrypted data message.

2. The method of claim 1, wherein the encrypted data message is encrypted using a public key of a recipient cryptographic key pair, and the recipient address is generated using the public key of the recipient cryptographic key pair.

3. The method of claim 1, wherein the transfer submission further includes a digital signature generated using a private key of a sender cryptographic key pair, and the method further includes:

validating, by the processor of the blockchain node, the digital signature using a public key of the sender cryptographic key pair.

4. The method of claim 3, wherein the generated blockchain data value further includes the digital signature.

5. The method of claim 1, wherein the number of past transfers is determined by evaluating a plurality of blockchain data values included in a plurality of blocks comprising the blockchain, and the number of past transfers is based on a number of blockchain data values that include the transfer token.

6. The method of claim 1, wherein validating that the transfer token is eligible for additional transfers includes:

deducting, by the processor of the blockchain node, a transfer count value included in the transfer token; and determining, by the processor of the blockchain node, that the deducted transfer count value is greater than zero.

7. A system for delivering encrypted data through a blockchain with limited transferability, comprising:

a blockchain network;

a blockchain node included in the blockchain network; and a plurality of additional nodes in the blockchain network, wherein the blockchain node includes a receiver receiving a transfer submission from an external sender computing device, said transfer submission including at least a transfer token, an encrypted data message, and a recipient address associated with a recipient to which the encrypted data message is intended, wherein said transfer token is limited to a predetermined number of allowed transfers that has initially been set by the blockchain network for transfer tokens, a processor determining past activity of the transfer token including a number of past transfers for the transfer token in a blockchain associated with a blockchain network that includes the blockchain node, validating that the transfer token is eligible for an additional transfer based on at least the number of past transfers and the predetermined number of allowed transfers, and generating, in response to validating the eligibility of the transfer token, a blockchain data value including at least the encrypted data message, the transfer token, and the recipient address, each received by the blockchain node, from the external sending computing device, in the transfer submission; and a transmitter (i) transmitting the generated blockchain data value to one or more additional nodes included in the blockchain network, and (ii) notifying the recipient, via an external recipient computing device, of the received encrypted data message.

8. The system of claim 7, wherein the encrypted data message is encrypted using a public key of a recipient cryptographic key pair, and the recipient address is generated using the public key of the recipient cryptographic key pair.

9. The system of claim 7, wherein the transfer submission further includes a digital signature generated using a private key of a sender cryptographic key pair, and the processor of the blockchain node further validates the digital signature using a public key of the sender cryptographic key pair.

10. The system of claim 9, wherein the generated blockchain data value further includes the digital signature.

11. The system of claim 7, wherein the number of past transfers is determined by evaluating a plurality of blockchain data values included in a plurality of blocks comprising the blockchain, and the number of past transfers is based on a number of blockchain data values that include the transfer token.

12. The system of claim 7, wherein validating that the transfer token is eligible for additional transfers includes:

deducting, by the processor of the blockchain node, a transfer count value included in the transfer token; and determining, by the processor of the blockchain node, that the deducted transfer count value is greater than zero.

* * * * *